Dec. 15, 1942.   C. W. TYSON   2,305,046
REFINING OF MINERAL OILS
Filed Dec. 11, 1940
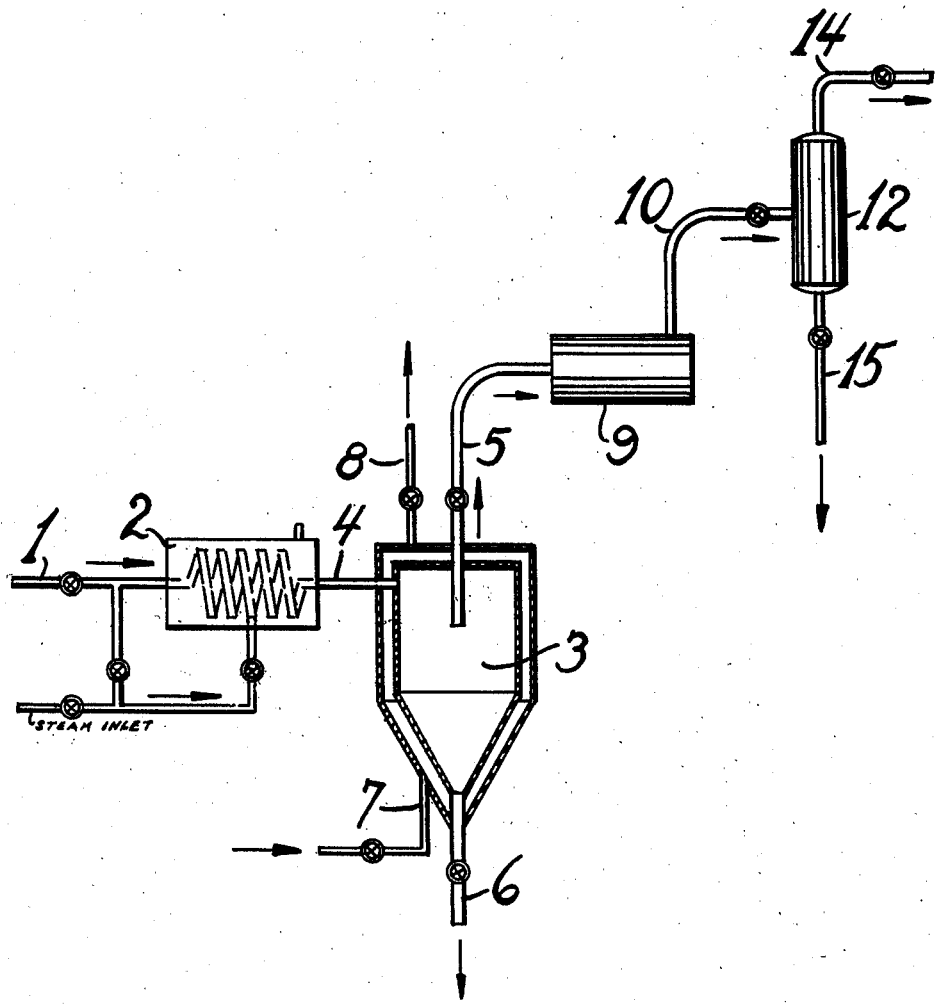
Charles W. Tyson Inventor
By P. L. Young Attorney Patented Dec. 15, 1942

2,305,046

UNITED STATES PATENT OFFICE 2,305,046

REFINING OF MINERAL OILS

Charles W. Tyson, Summit, N. J., assignor to Standard Oil Development Company, a corporation of Delaware Application December 11, 1940, Serial No. 369,544

1 Claim. (Cl. 196—58)

The present invention relates to the refining of mineral oils. The invention is more particularly concerned with an improved process for separating unvaporized constituents of heavy residues or thermally heated stocks, from vaporized constituents at high operating temperatures. In accordance with a specific modification of the present process, petroleum residues having relatively low gravities and boiling within a relatively high boiling range are heated in the presence of steam to temperatures adapted to secure vaporization of a maximum amount of the residue. The heated vaporized residue together with steam is then passed into a cyclone separator, the walls of which are preferably externally cooled in such a manner that the temperatures of the same are relatively low. By operating in this manner, it is possible to withdraw a vaporized product free of unvaporized constituents from the separator substantially without decreasing the temperature of the vaporized constituents and to segregate unvaporized constituents without having deleterious coke formations occurring on the walls of the separator due to decomposition of the unvaporized material.

It is known in the art to employ separators, particularly of the cyclone type, in a manner to separate solid particles from vaporous mixtures containing the same. It is also known in the refining of petroleum oils to heat relatively high boiling fractions having relatively low gravities to temperatures at which a substantial part of the hydrocarbon constituents will pass into the vaporous phase upon flashing of the heated product. While operations of this character secure a substantial separation of the vaporized constituents from the unvaporized constituents due to the nature of the operation, the overhead product comprises and contains a substantial amount of unvaporized constituents. In many operations, particularly if the vaporous product is a feed stock for a subsequent refining operation, such as a catalytic cracking, alkylation, or a related process it is necessary to completely remove these unvaporized constituents from the vaporous product. This is essential since, for example, in a catalytic cracking operation, the unvaporized oil particles form and deteriorate on the catalyst and thus materially decrease the efficiency and the life of the same. It has, therefore, been suggested that the heated petroleum residues be flashed into cyclone-type separators in order to secure an efficient separation of the vaporous constituents from the unvaporized substances. However, operations of this character have not been entirely successful due to the fact that the unvaporized oil particles further react and decompose on the top and walls of the separator, forming solid, hard, coke-like surfaces on the same. This is extremely undesirable and in many instances prohibits commercial operations of this character. I have, however, now discovered that, providing the walls of the flash zone of this character be cooled, the oily particles which are not vaporized and which normally form and collect on the walls are not exposed to undesirable cracking conditions for an extended period of time. The particles next to the wall remain in the cyclone for a longer time but are cooled by the wall to a temperature at which undesirable decomposition does not occur. The other particles flow freely downwardly along the walls and do not remain in the cyclone long enough to decompose. The unvaporized oil constituents thus flow downward without further degradation and are withdrawn from the bottom of the cyclone.

The application of this invention enables higher flash temperatures to be used than are presently employed. At the same time the vapors issuing from the flash zone will be at a higher temperature because of the elimination of cooling by reflux or other scrubbing means.

The process of my invention may be readily understood by reference to the attached drawing illustrating one modification of the same. For purposes of description, it is assumed that the feed materials comprise a heavy petroleum residue which is to be vaporized, and the vaporized constituents are to be subsequently cracked in a catalytic cracking operation. The feed oil comprising a heavy petroleum residue is introduced by means of feed line 1, to heating means 2 which may comprise any suitable heating arrangement, such as a heating coil, a series of furnaces, or other equivalent means. The heated products comprising vaporized and unvaporized oil constituents are then introduced into separator 3 by means of line 4. These products pass through separator 3 in a manner to remove overhead by means of line 5 the vaporous constituents and to remove by means of line 6 unvaporized oily constituents. In accordance with the present process, separator 3 is operated in a manner that the walls of said separator are cooled to the desired temperature by the introduction of a suitable cooling medium by means of line 7 and the withdrawal of the same by means of line 8. This cooling medium circulates in a jacket maintained without the walls of separator 3. The vaporous product, free of unvaporized constituents, is passed into a catalytic cracking zone 9 operated under temperature and pressure conditions adapted to produce the desired product. The cracked product is withdrawn from cracking zone 9 by means of line 10, and introduced into distillation zone 12. Conditions are adjusted to remove the desired distillate overhead by means of line 14 and to remove the desired bottoms by means of line 15.

When operating in this manner, it is possible to collect the unvaporized oil constituents in the bottom of separator 3 and to withdraw the same by means of line 6 without having these oil particles further decomposed to coke and form objectionable hard coating on the walls of the separator.

The invention essentially comprises a flash zone to segregate unvaporized oil constituents from vaporized particles operated in such a manner as to prevent coke deposition on the walls of the apparatus. The process of the present invention may be widely varied and may be adapted for the treatment of any mixture in which it is desired to separate unvaporized particles from vaporous particles.

The invention, however, is particularly adapted in the refining of petroleum oils, especially in the production of vaporized constituents from heavy petroleum residues having gravities in the range from about 10° A. P. I. to 35° A. P. I., and is especially suitable for the preparation of vaporous feed stocks which are to be subsequently catalytically cracked.

In these operations heavy petroleum residues having gravities in the range from about 10° A. P. I. to 35° A. P. I. are heated to a temperature in the range from about 700° to 1100° F. at a pressure of about 1 lb. absolute to 1000 lbs. gauge. The heated petroleum residues at these pressures are then passed into the separation zone in a manner to separate the vaporized constituents from the unvaporized particles. In accordance with the preferred modification of the invention, it is desired to maintain the temperature in the separation zone at a temperature preferably below 950° F. and at a pressure preferably below 300 lbs.

In this invention the vapors and liquid issuing from a furnace or other heater are led directly into a cyclone separator in which the separation takes place. Cooling of the separator is obtained by the use of a water jacket or other suitable cooling means surrounding the cyclone separator. A particularly desirable method of cooling the walls of the separator is to maintain a cooling medium at its boiling point within the jacket surrounding the walls of the separator. Under these conditions, the vaporous product is removed from the jacket by means of line 8. Suitable cooling liquids are, for example, water, diphenyl ether and "Dow therm." The preferred cooling medium comprises water. The walls may also be cooled by circulating a molten salt. Inasmuch as only liquids or solids come in contact with the outside metals of the cyclone separator, there will be little cooling of the vapors produced in the process. By this means, therefore, a small and simple apparatus will be available which will not foul due to coking, which will remove efficiently the heavy ends left upon distillation, and which will not appreciably cool the vapors flashed in the operation.

The process of the present invention is not to be limited by any theory or mode as to operation but only in and by the following claim in which it is desired to claim all novelty insofar as the prior art permits.

I claim:

Process for the treatment of a feed mixture for the separation of vaporized oil constituents from unvaporized oil constituents at temperatures at which the unvaporized constituents will further decompose, which comprises passing the feed mixture into a cyclone separator at a temperature at which no vaporization of the liquid will occur, cooling the walls of said separator by means of water circulated in a jacket without said wall, and withdrawing the vaporized constituents overhead and the unvaporized constituents as a bottoms.

CHARLES W. TYSON.